(12) United States Patent
Kalofonos et al.

(10) Patent No.: US 8,868,105 B2
(45) Date of Patent: Oct. 21, 2014

(54) METHOD AND APPARATUS FOR GENERATING LOCATION STAMPS

(75) Inventors: Dimitris Kalofonos, Cambridge, MA (US); James Card, Nashua, NH (US); Zoe Antoniou, Waltham, WA (US); Mark Peterson, Quincy, MA (US); Hans Peter Brondmo, San Francisco, CA (US); Eric Cheng, Newton, MA (US); Jacob Barss-Bailey, Cambridge, MA (US); Eric Anthony Silva, Somerville, MA (US)

(73) Assignee: Nokia Corporation, Espoo (FI)

( * ) Notice: Subject to any disclaimer, the term of this patent is extended or adjusted under 35 U.S.C. 154(b) by 203 days.

(21) Appl. No.: 13/280,059

(22) Filed: Oct. 24, 2011

(65) Prior Publication Data
US 2013/0102328 A1  Apr. 25, 2013

(51) Int. Cl.
*H04W 24/00* (2009.01)
*H04W 4/02* (2009.01)
*H04W 4/00* (2009.01)

(52) U.S. Cl.
CPC ............... *H04W 4/02* (2013.01); *H04W 4/008* (2013.01)

USPC ......... 455/456.2; 455/436; 370/498; 709/231

(58) Field of Classification Search
CPC .............................. H04W 4/02; H04W 4/008
USPC ......... 455/456.1, 436, 456.3, 456.2; 709/236, 709/231, 223; 370/498; 340/8.1, 572.1
See application file for complete search history.

(56) References Cited

U.S. PATENT DOCUMENTS

| | | | |
|---|---|---|---|
| 6,239,719 B1* | 5/2001 | Hopkins | 340/7.51 |
| 6,845,241 B2* | 1/2005 | Edlund et al. | 455/456.1 |
| 8,086,245 B2* | 12/2011 | Karaoguz et al. | 455/456.1 |
| 2001/0047407 A1* | 11/2001 | Moore et al. | 709/223 |
| 2002/0143991 A1* | 10/2002 | Chow et al. | 709/245 |
| 2004/0193707 A1* | 9/2004 | Alam et al. | 709/223 |
| 2007/0117572 A1* | 5/2007 | Adam et al. | 455/456.1 |
| 2009/0300707 A1* | 12/2009 | Garimella et al. | 726/1 |
| 2012/0220314 A1* | 8/2012 | Altman et al. | 455/456.3 |
| 2012/0233199 A1* | 9/2012 | Jenkins | 707/769 |

* cited by examiner

*Primary Examiner* — Mahendra Patel
(74) *Attorney, Agent, or Firm* — Ditthavong & Steiner, P.C.

(57) ABSTRACT

An approach for generating location stamps in response to a request from a device is presented. A location stamping platform receives a request from a device for one or more location stamps. The location stamping platform then processes and/or facilitates a processing of a hierarchy of one or more policies to determine one or more candidate location stamps in response to the request.

18 Claims, 11 Drawing Sheets

100

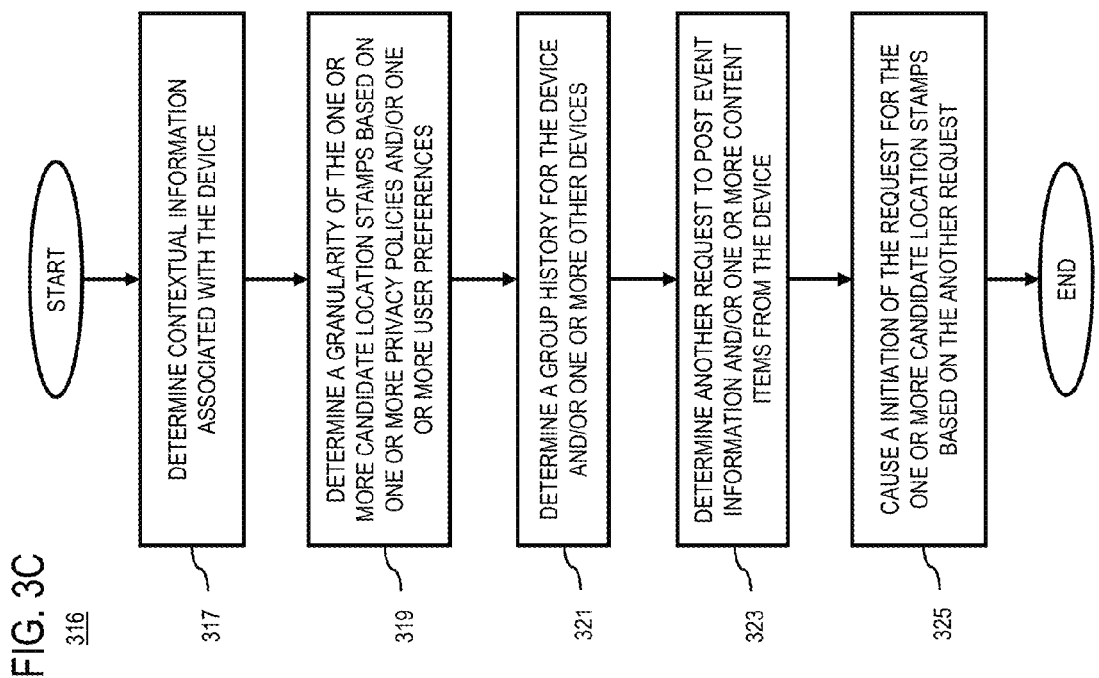

FIG. 3C
316

317 — DETERMINE CONTEXTUAL INFORMATION ASSOCIATED WITH THE DEVICE

319 — DETERMINE A GRANULARITY OF THE ONE OR MORE CANDIDATE LOCATION STAMPS BASED ON ONE OR MORE PRIVACY POLICIES AND/OR ONE OR MORE USER PREFERENCES

321 — DETERMINE A GROUP HISTORY FOR THE DEVICE AND/OR ONE OR MORE OTHER DEVICES

323 — DETERMINE ANOTHER REQUEST TO POST EVENT INFORMATION AND/OR ONE OR MORE CONTENT ITEMS FROM THE DEVICE

325 — CAUSE A INITIATION OF THE REQUEST FOR THE ONE OR MORE CANDIDATE LOCATION STAMPS BASED ON THE ANOTHER REQUEST

500

METHOD AND APPARATUS FOR GENERATING LOCATION STAMPS

BACKGROUND

Service providers and device manufacturers (e.g., wireless, cellular, etc.) are continually challenged to deliver value and convenience to consumers by, for example, providing compelling network services. One area of interest is the development of location stamps for use in association with content such as documents, pictures, videos, audio files, messages, etc. Location stamps are typically used to provide location details regarding the content or to specify a particular point-of-interest corresponding to the location. Various location determination approaches may be used to determine the location details, including, internet protocol (IP) address lookup, browser based geolocation reporting, global positioning system (GPS) sensor detection, etc.

Unfortunately, non-mobile devices such as desktop computers are often not equipped with sensors to support more advanced detection approaches such as GPS detection. As for those devices featuring these sensors, many users disable the location detection features for privacy purposes. As an alternative, a browser or other application of the device for accessing content can identify the IP address; albeit the acquired address is not always an accurate depiction of the actual location of the device. Moreover, IP address information is often unreliable as different applications (e.g., browsers) report IP address information differently.

SOME EXAMPLE EMBODIMENTS

Therefore, there is a need for an approach for generating location stamps in response to a request from a device.

According to one embodiment, a method comprises receiving a request from a device for one or more location stamps. The method also comprises processing and/or facilitating a processing of a hierarchy of one or more policies to determine one or more candidate location stamps in response to the request. The one or more policies cause, at least in part, a determination of the one or more candidate location stamps based, at least in part, on a cache history, a personal history, a reverse geocoding, a point-of-interest determination, a regional determination, or a combination thereof associated with the device.

According to another embodiment, an apparatus comprises at least one processor, and at least one memory including computer program code for one or more computer programs, the at least one memory and the computer program code configured to, with the at least one processor, cause, at least in part, the apparatus to receive a request from a device for one or more location stamps. The apparatus is also caused to process and/or facilitate a processing of a hierarchy of one or more policies to determine one or more candidate location stamps in response to the request. The one or more policies cause, at least in part, a determination of the one or more candidate location stamps based, at least in part, on a cache history, a personal history, a reverse geocoding, a point-of-interest determination, a regional determination, or a combination thereof associated with the device.

According to another embodiment, a computer-readable storage medium carries one or more sequences of one or more instructions which, when executed by one or more processors, cause, at least in part, an apparatus to receive a request from a device for one or more location stamps. The apparatus is also caused to process and/or facilitate a processing of a hierarchy of one or more policies to determine one or more candidate location stamps in response to the request. The one or more policies cause, at least in part, a determination of the one or more candidate location stamps based, at least in part, on a cache history, a personal history, a reverse geocoding, a point-of-interest determination, a regional determination, or a combination thereof associated with the device.

According to another embodiment, an apparatus comprises means for receiving a request from a device for one or more location stamps. The apparatus also comprises means for processing and/or facilitating a processing of a hierarchy of one or more policies to determine one or more candidate location stamps in response to the request. The one or more policies cause, at least in part, a determination of the one or more candidate location stamps based, at least in part, on a cache history, a personal history, a reverse geocoding, a point-of-interest determination, a regional determination, or a combination thereof associated with the device.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3C are flowcharts of a process for generating location stamps in response to a request from a device, according to various embodiments;

DESCRIPTION OF SOME EMBODIMENTS

Examples of a method, apparatus, and computer program for generating location stamps in response to a request from a device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
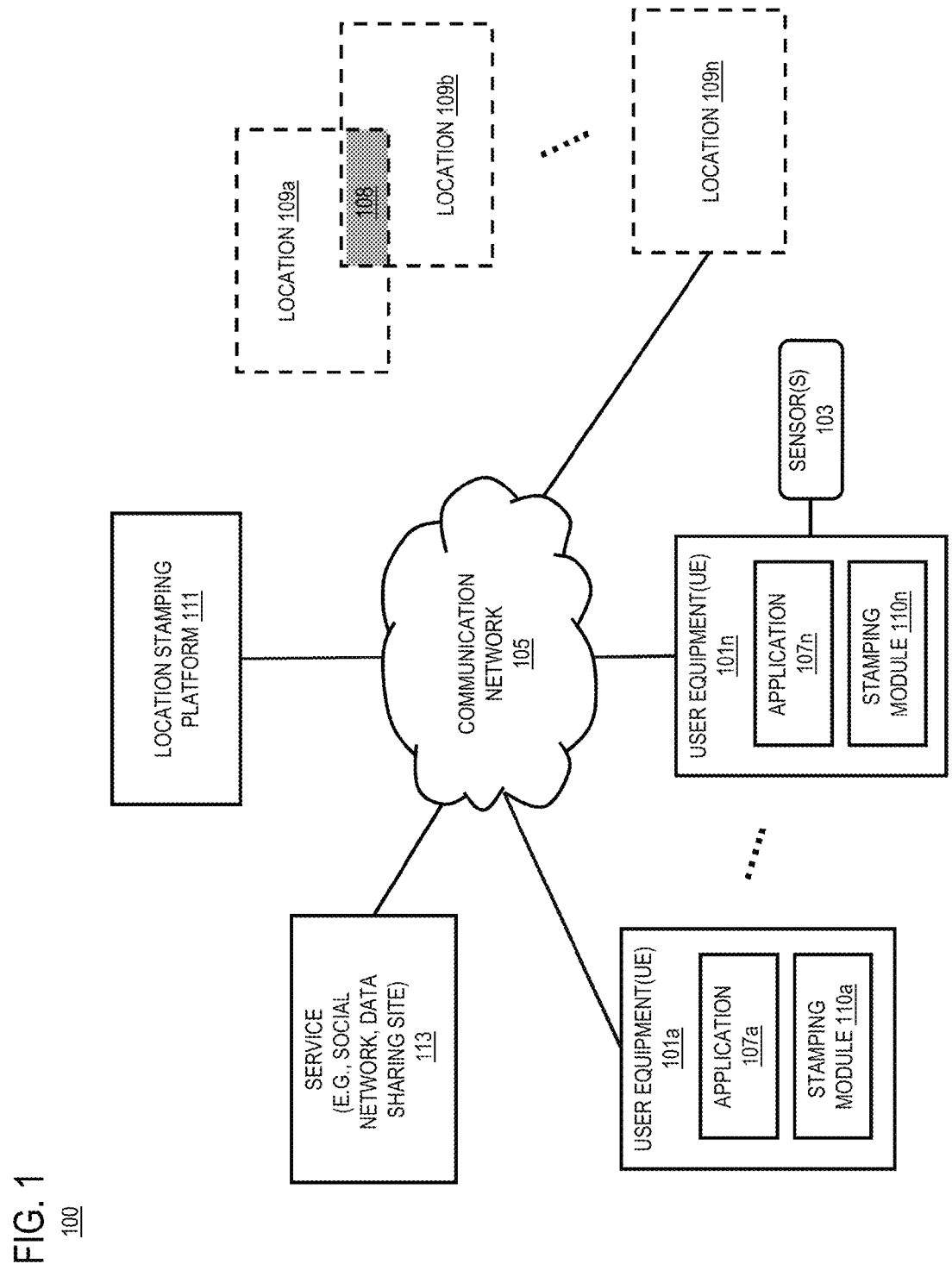
FIG. 1 is a diagram of a system capable of generating location stamps in response to a request from a device, according to one embodiment.

FIG. 1 is a diagram of a system capable of generating location stamps in response to a request from a device, according to one embodiment. The system 100 includes a location stamping platform 111 that is configured to interact with one or more user devices, i.e., user equipment (UE) 101a-101n, to provide location stamps on demand. One or more location stamps may be generated automatically by the location stamping platform 111 for selection by a user of UE 101a-101n in response to a request. In certain instances, the location stamping platform 111 may also be configured to associate a location stamp with other information (e.g., a photo, a document) based on one or more stamp generation and/or application policies. By way of example, the location stamping platform 111 may be provided as a service for execution by the UE 101a-101n by a service provider on a subscription basis.

A location stamp may include, for example, a set of data for describing a geographic location. By way of example, a location stamp may include coordinates data (e.g., longitude and latitude) or a geospatial coordinates. In addition, the location stamp may include information useful for deriving or deducing a physical location such as an internet protocol (IP) address. Typically, location stamps are associated with content capable of being generated and/or accessed by the one or more UEs 101a-101n, including documents, pictures, videos, audio files, messages, etc. As such, the stamps are generated as tags or metadata that is useful for providing location details regarding the content or to specify a particular point-of-interest for which the content is related.

Location stamps are widely used by device users for relaying location specific details regarding content. For example, a user of a mobile device with an integrated camera can generate a location stamp to be stored along with any photos they take at their favorite restaurant. Longitude and latitude coordinates of the restaurant location may be encoded as part of the (exchangeable image file format) EXIF properties of the photo. As another example, the user can post a document to a social networking site, shared storage location, or other network resource in association with a location stamp. Under this scenario, the location stamp is used as a parameter for subsequent retrieval, organizing or mining of the document. In some instances, the user creates the location stamp—e.g., to convey an address, a city, a name of a venue or building—by manually entering location details as one or more document property fields. While manual entry may be the most accurate means of generating a location descriptor for content, it is also tedious and time consuming for the user. This is especially true as the amount of content to be stamped increases.

In other instances, the user device may employ various location determination approaches for enabling auto-generation of a stamp, e.g., such as geotagging. Under this approach, location information is detected by way of one or more approaches by a calling application or service. Once detected, this information is then conferred to the calling application or service and used in generating a location stamp. The more accurate the location determination approach the more reliable the location stamp. Various techniques for determining the location information may include internet protocol (IP) address lookup, browser based geolocation reporting, global positioning system (GPS) sensor detection, cellular signal triangulation and Wi-Fi war driving database access. Unfortunately, these approaches tend to yield unreliable results or are limited to only select (but not all) user devices.

For example, an IP address lookup can be performed as the user accesses a communication network 105 via a browser application, document editor, or other tool via the device. Information derived from performing the lookup may include, for example, a hostname, country, region/state, city, latitude, longitude, and telephone area code. Nonetheless, the IP address is related to but not necessarily representative of the actual location of the user at the moment of content access or generation. Also, because each application (e.g., browser) uses its own methodology to collect information about their networking environment, location results may vary from one application to the next. Hence, latitude and longitude coordinates as determined via one browser may vary in another. Still further, when the IP address as looked up corresponds to a proxy server or virtual private network, the actual IP address of the requesting user device cannot be found.

GPS sensor detection and cellular signal triangulation techniques require that the user device be equipped with one or more sensors, i.e., a GPS detection sensor, network detection sensor, etc. Unfortunately, non-mobile devices are not usually equipped with these sensors. Also, the information maintained in a database compiled as a result of Wi-Fi war driving is only as effective as the compilation of network locations maintained therein. However, outdated or inaccurate information can result in the return of unreliable location information to the requesting service and/or user device.

Hence, if no latitude and longitude information can be determined via the various techniques, the user device is unable to effectively generate a reliable location stamp. Currently, there is no reliable solution for enabling a user to distinguish between: (a) a user device, such as a GPS enabled mobile phone, that knows its geolocation; and (b) a user device, such as a laptop of desktop computer, that can attempt to derive its geolocation.

To address this problem, a system 100 of FIG. 1 introduces the capability to generate one or more location stamps based on a hierarchy of one or more policies. In certain embodiments, a location stamping platform 111 is configured to interact with UE 101a-101n to execute the one or more polices. By way of example, the policies may include various rules and settings for: (1) affecting the acquiring of location information; and (2) generating one or more location stamps based on the acquired location information. The policies are organized for execution hierarchically, so as to correspond to an order of derivation, determination and/or generation of the one or more location stamps. In addition, the one or more location stamps are rendered to a user interface of UE 101a-101n by the location stamping platform 111 as candidates for selection by a user in response to a request. The location stamps are also presented in accordance with the hierarchical order of execution of the one or more policies.

The hierarchy of policies corresponds to a processing scheme that accounts for various inputs. By way of example, the one or more policies include a processing of a cache history of the user device. The cache history may include stored and/or prior used location stamps for being associated with content. In certain embodiments, the cache history is retrieved by way of an application programming interface (API) of an application that initiated a request for a location stamp. In other instances, the cache history may include the results of user searches, which can be used to provide a context for a current location stamp request (e.g., indicate or directly specify a location, points-of-interest to the user). It is noted that the cache history includes information corresponding to the current or most recent session/activity of the user of the UE 101a-101n. Still further, the cache history includes information corresponding to the current location of the UE 101a-101n. The cache history is continuously updated by the location stamping platform 111 and cleared every time a new location of the UE 101 is determined.

The policies also call for the processing of personal history information related to the user, which includes previously used location stamps. In certain embodiments, the personal history information includes only those location stamps that correspond to a predetermined proximity threshold of the current location of the requesting UE 101. By way of example, the proximity threshold may be established as 300 meters from the current location. Under this scenario, if it is determined the device has moved to another location beyond 300 meters, the platform 111 is caused to clear the history. As a result, personal history information is collected relative to the generation of location stamps based on the new location. It is noted that the proximity threshold may be established by a provider of the location stamping platform 111 or alternatively by the user.

Another of the one or more policies calls for the execution of a reverse geocoding of location information (e.g., latitude, longitude). By way of example, the reverse geocoding is performed to render a readable address or place name. This policy execution permits the identification of nearby street addresses, places, and/or area subdivisions such as neighborhoods, county, state, or country. It is noted the resulting address may be a high-level address, i.e., does not include a street number. This level of granularity of address information provides for a deeper level of exactness of location stamps.

A point-of-interest (POI) determination is also caused to be executed per the hierarchy of one or more policies, wherein the one or more location stamps correspond to the POIs accordingly. By way of example, the POIs may include a specific venue such as a restaurant, museum, business, landmark, park or other place corresponding to a particular location. Name information or other identification may also be associated with the location stamp for representing the POI. As such, POI based location stamps are determined to be, or fall within, range of a current location of the UE 101. In addition, a regional determination corresponding to a particular town may be determined per the hierarchy of one or more policies.

The location stamping platform 111 operates in connection with a UE 101a-101n in response to a request for a location stamp. The request may be initiated by way of an application 107a-107n of the UE 101a-101n, such as a web browser, document editor or photo editor. In addition, the request may be initiated by way of a service available for access by the UE 101a-101n, such as a social networking service, a data sharing site, or the like. Operating in connection with the application is a stamping module 110a-110n, a module (optional) for enabling requests to be entered. In certain embodiments, the stamping module 110a may also be used to facilitate a posting of content with respect to the location stamp. By way of example, the stamping module 110 may render a user interface for submitting a location stamp request and for facilitating the selection of one or more location stamps relative to a given location 109a-109n of the user, etc. As such, the stamping module 110a-110n of respective UE 101a-101n may operate in tandem with the calling applications 107a-107n or services for enabling the posting, publishing, accessing or sharing of content. In certain embodiments, the stamping module may also perform the equivalent executions of the location stamping platform 111. This includes the execution of APIs, operating system commands and web and user interface functions. Features of the stamping module 110a-110n as it interacts with an application 107a-107n are described more fully later on with respect to FIGS. 4A-4D.

It is noted that the hierarchy of policies may be employed in the generation of location stamps for UE 101a-101n of varying configuration. By way of example, the location stamping platform 111 may interact with devices having integrated sensors 103, such as a tablet or mobile phone with built-in GPS detection sensor(s). Alternatively, the location stamping platform 111 may be used in connection with more stationary devices such as, such as a laptop or desktop. When the user device is a mobile device, it can be transported to various locations 109a-109n. The locations 109 may correspond to one or more geographic coordinates GPS detection measures. Furthermore, the one or more locations 109 may specify a particular place or venue. In certain embodiments, the one or more locations 109a-109n may be configured to a communication network 105, such as by way of a router, proxy system, server or other means—i.e., to enable a Wi-Fi connection. This is depicted by way of example with respect to location 101n, which is shown as being connected to the communication network 105. As such, when a user of UE 101n having a wireless detection sensor 103 approaches or enters the location 109n, it may detect signals generated by the location. One or more location detection techniques, including signal triangulation, can be applied for detecting the location of the user equipment relative to the location 109n.

While each location corresponds to a distinct set of geographic and/or geospatial coordinates, they may be relatively close to one another. The location stamping platform 111 may be configured to generate one or more location stamps to account for locations 109 in close proximity—i.e., location 109*a* and 109*b*. Hence, the platform 111 may generate and recommend location stamps based on whether a proximity threshold condition is fulfilled. For example purposes, the region 108 represents proximity where the location stamps are equivalent. The location stamps are different, however, outside of this region 108. Exceeding of the threshold may warrant generation of updated location stamps while a determined may be generated, based at least in part, in response to a proximity threshold generate location stamps support the stamping within a given proximity. In certain instances, the locations 109*a*-109*n* may be within range of one another—i.e., distinct restaurants next to each other, neighboring cities, etc.

As shown in FIG. 1, the system 100 comprises a user equipment (UE) 101 having connectivity to the location stamping platform 111 via a communication network 105. As noted previously, access to the location stamping platform 111 is facilitated by way of the application 107*a* and stamping module 110. It is noted that the functionality of the stamping module 110 may be directly integrated into the application 107*a*-107*n* for permitting network access to the location stamping platform 111. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101 and the location stamping platform 111 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
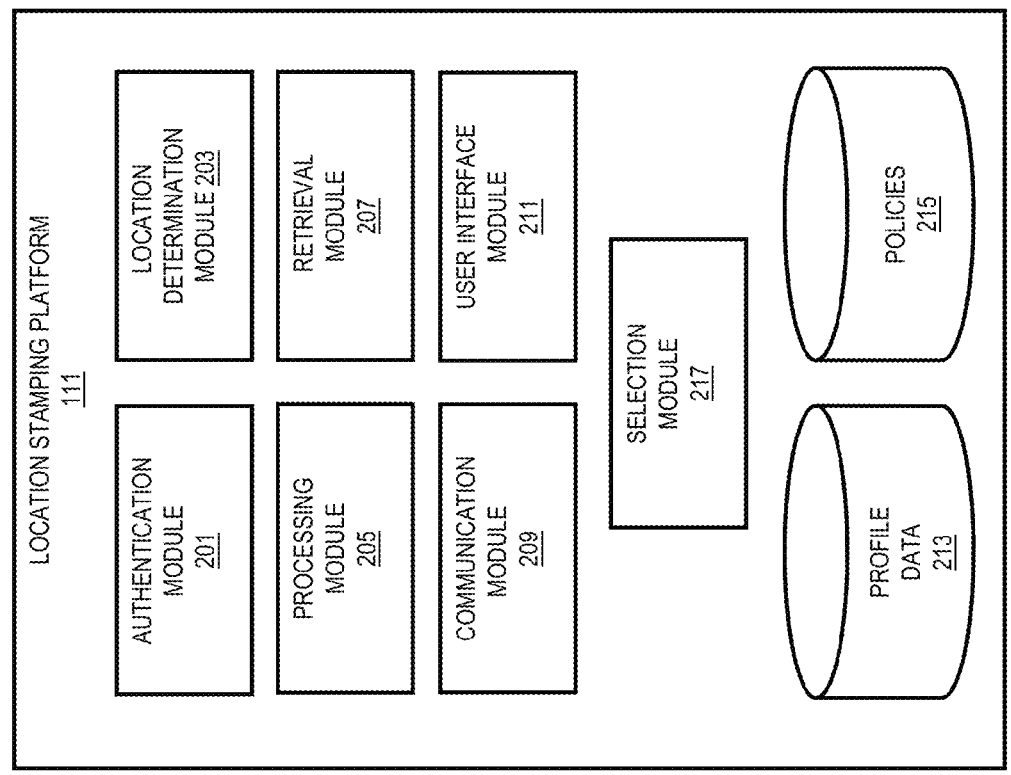
FIG. 2 is a diagram of the components of a location stamping platform, according to one embodiment.

FIG. 2 is a diagram of the components of a location stamping platform, according to one embodiment, according to one embodiment. By way of example, the location stamping platform 111 includes one or more components for generating location stamps in response to a request from a device. It is contemplated that the functions of these components may be combined in one or more components or performed by other components of equivalent functionality. In this embodiment, the location stamping platform 111 includes an authentication module 201, a location determination module 203, a processing module 205, a retrieval module 207, a communication module 209, a user interface module 211 and a selection module 217. The location stamping platform 111 also maintains a profile database 213 for maintaining records regarding one or more users subscribed to the platform 111 and a policy database 215 for maintaining the hierarchy of one or more policies for affecting processing of location information.

In one embodiment, the authentication module 201 authenticates users and user equipment 101*a*-101*n* for interaction with the location stamping platform 111. By way of example, the authentication module 201 receives a request to generate one or more location stamps based, at least in part, on location information regarding the request UE. Input is received on the basis of a registered or subscribed user. The subscription process may include a specification of data sources for sharing of experience information. In addition, various preferences and settings information may be established, including preferred points-of-interest, location of residence/work, frequently visited locations, previously noted location stamps, etc. The subscription settings may be referenced to a specific user, user device, or combination thereof as profile data 213. Also, it is noted that the profile data may contain personal history information for use in generating one or more location stamps.

The authentication process performed by the module 201 may also include receiving and validating a login name and/or user identification value as provided or established for a particular user (host) during a subscription or registration process with a provider of the platform 111. The login name and/or user identification value may be received as input provided by the user from UE 101 via a graphical user interface to the platform 111 (e.g., as enabled by user interface module 211). Profile data 213 for respective subscribers may be cross referenced as part of the login process. Alternatively, the login process may be performed through automated association of profile settings maintained as registration data with an IP address, a carrier detection signal of a user device, mobile directory number (MDN), subscriber identity module (SIM) (e.g., of a SIM card), radio frequency identifier (RFID) tag or other identifier.

Still further, the authentication module 201 may be configured to receive a request for initiating generation of one or more location stamps as candidates for selection by the user. This is performed pursuant to the subscription validation process. Upon receipt of a request, the authentication module 201 alerts the location determination module 203 of the request.

In one embodiment, the location determination module 203 determines the current location of the requesting user device based on available information. The location determination module 203 is also configured to activate a location detection function of the requesting device, if it is so equipped, in order to retrieve current location information accordingly. By way of example, the location determination module 203 performs an IP address lookup based upon the request as received from a UE, i.e., a device that is not equipped with location detection sensors. Based on the lookup, geolocation data including at least the longitude and latitude of the requesting device is determined. Under this scenario, the current stored location pursuant to the lookup is set by the location determination module 203 as the current location. This location information is then passed accordingly to the processing module 205.

As another example, the location determination module 203 may request current GPS coordinate data for determining the location. Under this scenario, precise location information is extracted and set as the current location. It is noted also, that the location determination module 203 may apply a combination of location determination approaches instead of or in addition to the above described, including cellular signal triangulation or accessing of a Wi-Fi access point database. The location determination module 203 returns at least a best available approximation of the current location, i.e., a basic latitude and longitude of the UE corresponding to the particular characteristics/capabilities of the UE. By employing a combination of approaches, the location of both non-mobile and mobile devices may be more reliably determined pursuant to a request for generation of one or more location stamps. Moreover, context information may be gathered by the location determination module 203 for refining the location results. This includes, for example, determining a current position of the UE, gathering activity information, etc.

In one embodiment, the processing module 205 operates in connection with the location determination module 203 to process the location information based, at least in part, on a hierarchy of one or more policies 215. Moreover, the processing module 205 generates the one or more location stamps to be presented by the user interface module 211 as candidates for selection by a user. Generation of the location stamps by the module 205 is therefore based on the policies 215, the determined current location information and historic and/or cached data regarding the requesting UE. The processing module 205 executes the policies 215 hierarchically, such that the order of execution corresponds to an order of derivation, determination and/or generation of the one or more location stamps for presentment to a user. Hence, the processing module 205 also affects the type of location determination approach employed by the location determination module 203 for generating, acquiring and/or determining location information. By way of example, the one or more policies 215 call for the processing module 205 to execute as shown with respect to Table 1 below:

TABLE 1

| Location determination |
| --- |
| IF (the last generated location stamp is < N units of time old) AND (the current location < M units of distance from previous location stamp); THEN use the last place stamp location ELSE use the current location Current stored location (as determined) is set to the place stamp (e.g., for non-mobile devices) |

| Location stamp generation |
| --- |
| Generate up to S location stamps based on personal history items shown (sorted by proximity to the current location or by recentness (i.e.,, newest first) Generate at least T but up to U point-of-interest location stamps sorted by proximity (i.e., those closest to the current location first) Generate one location stamp based on the determined/current longitude and latitude Generate one or more city-town location stamps sorted by proximity (i.e., those closest to the current location first) |

As noted in Table 1, the policies include location determination policies as well as location stamp generation policies. In the latter portion of the policy table of Table 1, the one or more location stamps are generated. In the former, the policies are applied in conjunction with the operations of the location determination module 203 for affecting the acquiring and/or determining of location information. A proximity and/or time threshold may be established for affecting the rate of updating and/or generating of location stamps relative to the determined current location of the UE. In certain embodiments, the user may also configure the processing module 205—via the subscription process—to restrict search results for generation of location stamps to within X units of distance (e.g., meters) from user's current position. By way of this restriction, the user is able to affect the range or scope of returned location stamp candidates In certain embodiments, the hierarchy of one or more policies for generation of location stamps is based on the processing of the information types (by the processing module 205) shown in Table 2 below:

TABLE 2 cache history information—listed only while the UE is in the same location and/or within the proximity threshold
personal history information—listed in increasing distance from current location; contains only places less than X units of distance from current location
reverse geocoding results information—listing of the high-level address (e.g. no street number) including neighborhood/town/city as extracted from reverse-geocoding of the current position; alternatively, point-of-interest data (e.g., POI 1) may be used for extraction (e.g., to save one round-trip).
point-of-interest information—listed in increasing distance from the current location; may include personal history data
regional determination information (e.g., town)—listed in increasing distance from the current location It is noted that the order of the information types as shown in the table corresponds to the order of presentment of location stamps to a user interface by the user interface module 211. Per this hierarchical order, default selection for a location stamp is the top listing of results generated via the cache history information. If no cache history information is relevant or available, the next selection in order of presentment is the top location stamp generated via personal history information. When no personal history information is relevant or available, next in the list is the top selection produced as a result of the reverse geocoding results information followed by the regional determination information (if deemed useful). It is noted that the reverse geocoding results information may be employed to enhance the results of location stamps generated based on regional determination information (e.g., distinguish between different locales, municipalities, provinces, or sections of a common town).

Also, per Table 2, the point-of-interest information processed by the module 205 may include restaurants, museums, landmarks and particular venues of interest to the user for being represented as location stamps (or place stamps). Such interests may be established as part of the subscription process via the authentication module 201 or determined based on known/historical search activity of the user of the requesting UE.

Historic data for generation of the location stamps, including personal history data and cache data, may be retrieved by way of a retrieval module 207, in certain embodiments. In addition, the retrieval module 207 records newly selected location stamp information for later use as historic information. It is noted that the retrieval module may also maintain group history information. A group history may include a collection of one or more location stamps related to one or more UE. By way of example, this may include location stamps generated for a group of device users at a mutual location.

In one embodiment, the selection module 217 associates a selected location stamp with a specific content item (e.g., document, photo) for storage, posting or sharing. Selection is performed via a user interface as rendered by the user interface module 211. The selection of a particular location stamp corresponding to particular content may also trigger execution of the retrieval module 207 for recording said selection as historical and/or personal history data.

In one embodiment, the various protocols, data sharing techniques and the like required for enabling collaborative execution between UE 101*a*-101*n* over the communication network is provided by way of a communication module 209. The communication module 209 allows the location stamping platform 111 to adapt to the different communication means, browser and application types and sensor capabilities of the UE 101*a*-101*n*. In addition, the communication module 209 appropriately packages data for effective receipt by a respective UE 101*a*-101*n* and for subsequent presentment via the user interface module 211.

In one embodiment, the user interface module 211 enables presentment of a graphical user interface for presenting the location stamps. The user interface module 211 generates the interface in response to application programming interfaces (APIs) or other function calls corresponding to the operating system of UE 101*a*-101*n*; thus enabling the display of graphics primitives.

Figure 3B:
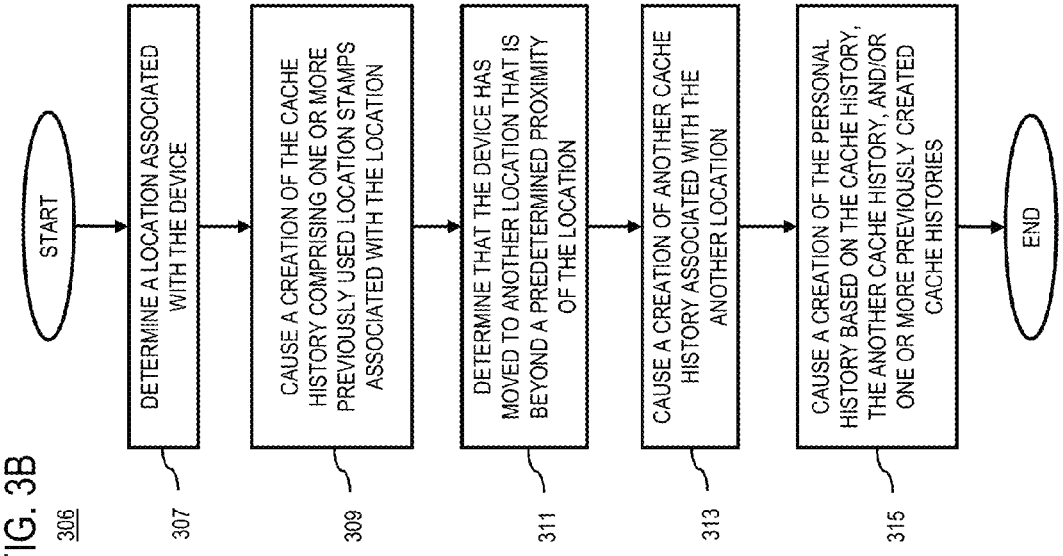
Figure 3A:
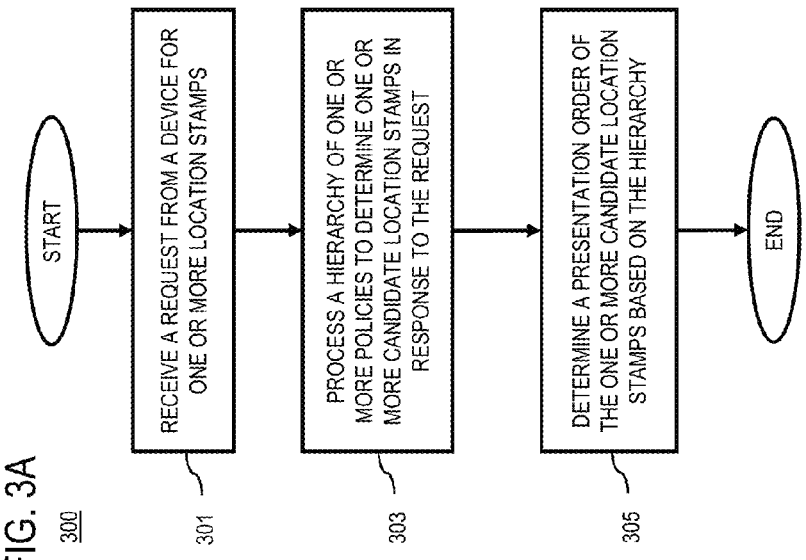
Figure 7:
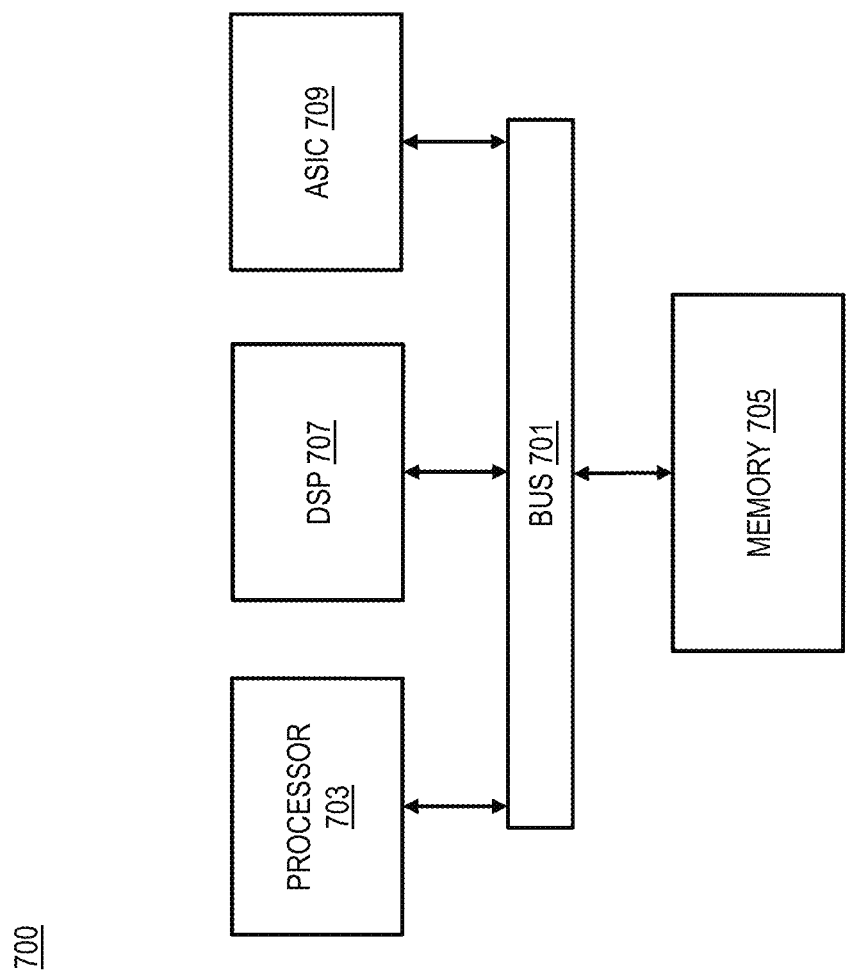
FIG. 7 is a diagram of a chip set that can be used to implement an embodiment of the invention.

FIGS. 3A-3C are flowcharts of a process for generating location stamps in response to a request from a device, according to various embodiments. In one embodiment, the location stamping platform 111 performs processes 300, 306 and 316, and is implemented in, for instance, a chip set including a processor and a memory as shown in FIG. 7.

In step 301 of process 300 (FIG. 3A), the location stamping platform 111 receives a request from a device for one or more location stamps. The request is facilitated by way of a user interface as rendered to the display of the device by a calling application 107 and/or integrated stamping module 110. In another step 303, the platform 111 processes a hierarchy of one or more policies to determine one or more candidate location stamps in response to the request. As noted, the policies may include one or more rules for affecting the establishing of a current location of a location stamp as well as the generation of one or more stamps (e.g., Table 1). The policies call for the determination to be based on processing of information regarding a cache history, a personal history, a reverse geocoding, a point-of-interest determination, a regional determination, or a combination thereof associated with the device. In addition, the policies may determine an order of the one or more candidate location stamps based on the hierarchy, per step 305.

In steps 307 and 309 of process 306 (FIG. 3B), the platform 111 determines a location associated with the device and causes a creation of the cache history comprising one or more previously used location stamps associated with the location. Per steps 311 and 313, the platform 111 further determines that the device has moved to another location that is beyond a predetermined proximity of the location and causes a creation of another cache history associated with the another location. As noted previously, the location stamping platform 111 accounts for changes in a relative location, pursuant to a proximity and/or timing threshold to ensure persistent generating of the most reliable location stamps. In another step 315, the platform causes a creation of the personal history based on the cache history, the another cache history, and/or one or more previously created cache histories. The history information is consistently updated to reflect the current selection and/or generation of location stamps relative to a given location.

In step 317 of process 316 (FIG. 3C), the platform 111 determines contextual information associated with the device. As noted previously, the determination of the one or more candidate locations is based, at least in part, on the contextual information. The contextual information may include, for example, timing information, location information, activity information, behavioral information, etc. Processing of the contextual information in concurrence with location information may enhance the reliability of a location stamp result as well as increase the likelihood of derivation of a location stamp from limited location information.

In step 319, the platform 111 determines a granularity of the one or more candidate location stamps based on one or more privacy policies and/or one or more user preferences. The granularity may relate to an extent of narrowness of a given location, wherein a low-level of granularity may be location information corresponding to a town or city, while a high-level of granularity may be correspond to a street. It is noted that the granularity may be enhanced due to reverse geocoding. Per step 321, the platform 111 determines a group history for the device and/or one or more other devices. The group history is further used to determine/generate one or more candidate location stamps.

In step 323, the platform 111 determines another request to post event information and/or one or more content items from the device. The event information may include a photo, video or other content related to a POI as selected, wherein the posting may be made to a social networking service, data sharing site, etc. Per step 325, the platform 111 causes initiation of the request for one or more candidate location stamps based on the another request. The another request may correspond to that made as a result of a change in location of the user device, a refining of context information, etc.

As noted previously, in certain embodiments, the stamping module 110a-110n at respective devices 101a-101n may operate as the location stamping platform 111. Under this scenario, therefore, the stamping module 110 may execute the one or more modules as described above. Implementation approaches may vary depending on device type, network configuration and availability and other considerations.

FIGS. 4A-4C and FIG. 5 are diagrams of user interfaces utilized in the processes of FIG. 3, according to various embodiments. For the purpose of illustration, the figures are described from the perspective of a user of a non-mobile device (FIGS. 4A-4C) and a mobile device FIG. 5 as they interact with the platform 111 to associate location stamps with specific content items.

Figure 4A:
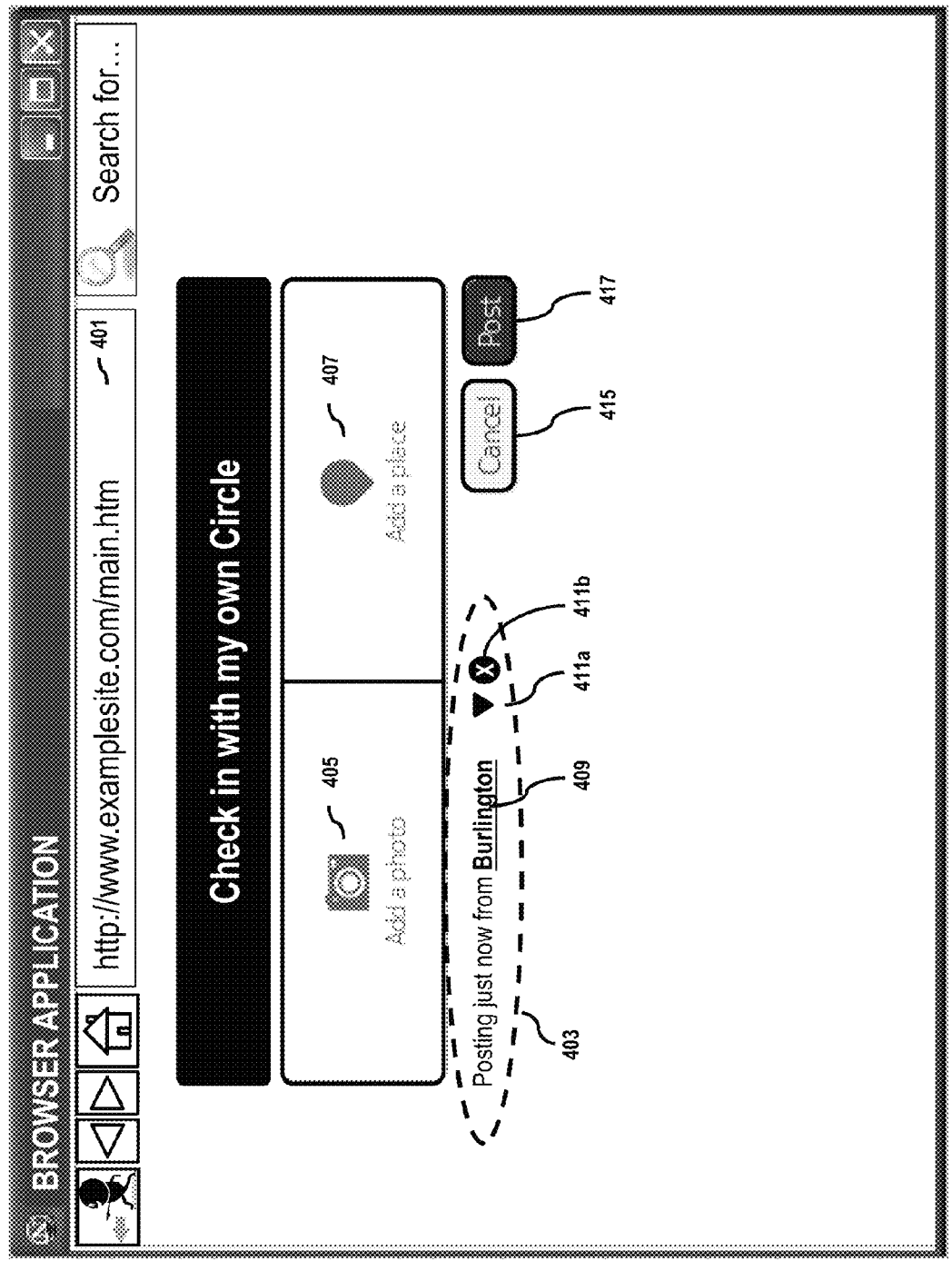
FIGS. 4A-4C and FIG. 5 are diagrams of user interfaces utilized in the processes of FIG. 3, according to various embodiments.

FIG. 4A depicts a browser application 400 as rendered to a user interface of a device. The browser 400 is directed to a website corresponding to a user resource locator 401 for enabling a user to post content and other information to be shared with others (e.g., friends). The user may select an Add Photo link 405 or Add a Place link 407 in order to load and/or generate content regarding a particular location accordingly. Hence, upon selection of the Add Photo link 405, the browser 400 causes a file directory interface to be rendered. From the interface, the user may select a particular photo file to upload. Similarly, the Add a Place link 407 enables the user to enter various details regarding the location and/or place corresponding to the photo. A Cancel action button 415 or Post action button 417 may be selected by the user to cancel or enable posting of the selected content and associated location stamps accordingly.

Figure 4B:
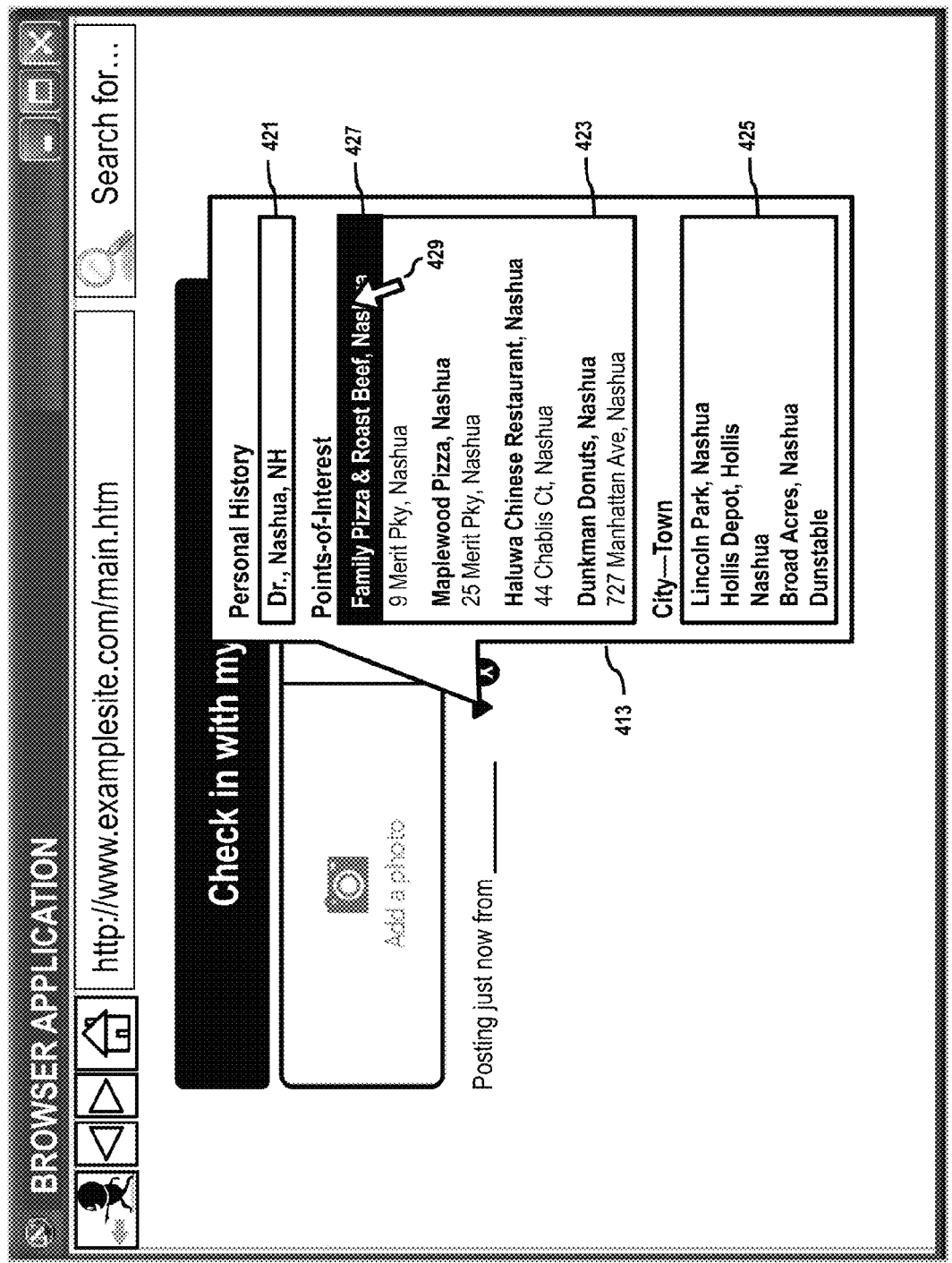

While manual entry is one way for the user to relay location information, the user device may interact with the location stamping platform 111 to enable automated generation of one or more location stamps. By way of example, the browser application 400 may operate in connection with a stamping module 110 for enabling generation of a widget 403. Under this scenario, the widget 403 is depicted as integrated in the website content via the stamping module for direct interaction with the user via. The widget 403 may indicate a field for presenting a determined current location 409 of the device—i.e., a location stamp—as well as one or more activation buttons 411a and 411b for requesting or cancelling one or more location stamps. When the determination is correct, the user may populate content relating to the location stamp (e.g., Burlington) to the Add a Place section by way of activating link 407. In other instances, however, the user may select a drop down menu activation button 411 to render a menu 413 of one or more location stamp candidates to the interface, as shown in FIG. 4B.

Under this scenario, the drop down menu 413 presents one or more location stamps in hierarchical order. Furthermore, for each category and/or location stamp type, the corresponding location stamps are presented in order of increasing distance from the best known (current) location of the user device. By way of example, a single location stamp 421 is shown based on processing of personal history information related to the user device. In this case, the general location stamp is generated to correspond to Nashua, N.H. based on the current location information. More specific selections are also presented as various points-of-interest 423 related location stamps, which feature more granular address information as well as the specific name of a venue of interest. In the present example, the POIs correspond to one or more restaurants and/or eateries. Still further, location stamps relating to one or more city—town selections 425 are also presented. It is noted that for this example, the location stamps are based on the determined longitude and/or latitude information as gathered via IP address lookup and/or geolocation inference.

Figure 4C:
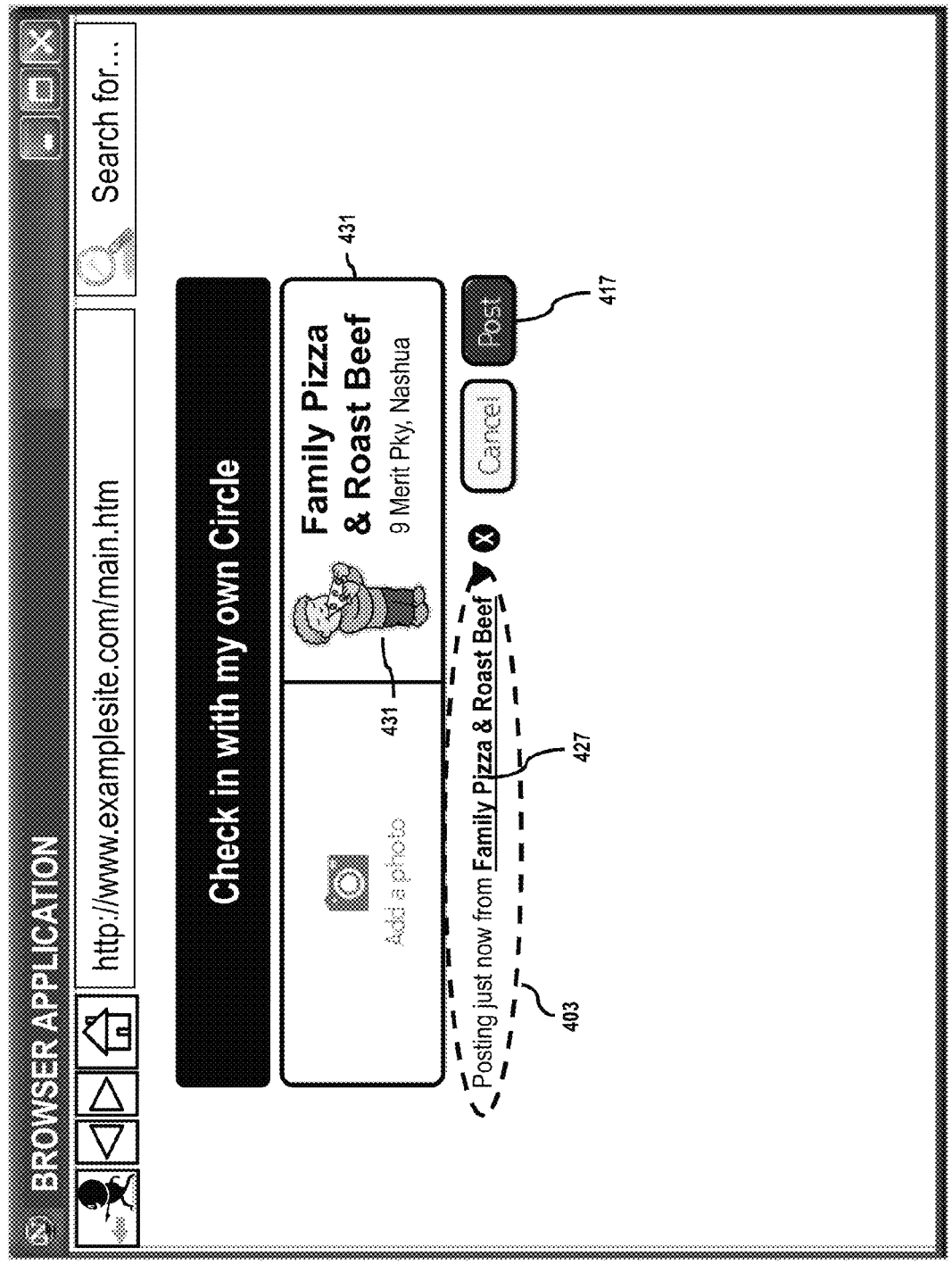

When the user selects the POI stamp 427 via a mouse activated cursor 429, the location stamping platform 111 is caused to associate this particular stamp with any uploaded content. Additional input means, such as touch activation or keyboard based selection may also suffice; depending on the capabilities of the user device in question. FIG. 4C depicts the user interface upon selection of location stamp 427, which corresponds to Family Pizza & Roast Beef. The user may also generate content related to the restaurant via the Add a Place link 407 depicted herein as section 431. As noted, the user may populate various fields for providing a description of the place, including address details, commentary regarding the restaurant, etc., for posting at section 431.

It is contemplated in future embodiments that certain information for generating section 431 is retrieved from a data source corresponding to the proprietor of the venue, i.e., Family Pizza & Roast Beef. In this case, the location stamping platform 111 retrieves various information from the data source including, for example, the restaurant logo 433, insignia and other information in addition to the address details. This retrieval may be performed by the retrieval module of the platform 111, such as based on a querying mechanism or in accordance with a partnership arrangement. One or more coupons, menus or other content related to the selected POI location stamp 427 may also be appended to the posting to be viewed by recipients of the post. Under this scenario, selection of a location stamp 427 automatically triggers retrieval of information for generating a post (to be used at the discretion of the user).

It is noted that upon selection of the POI location stamp 427, the determined current location 409 of the device as shown via the widget 403 is caused to reflect the selection. When finished, the user selects the Post action button 417 to proceed with posting the information.

Figure 5:
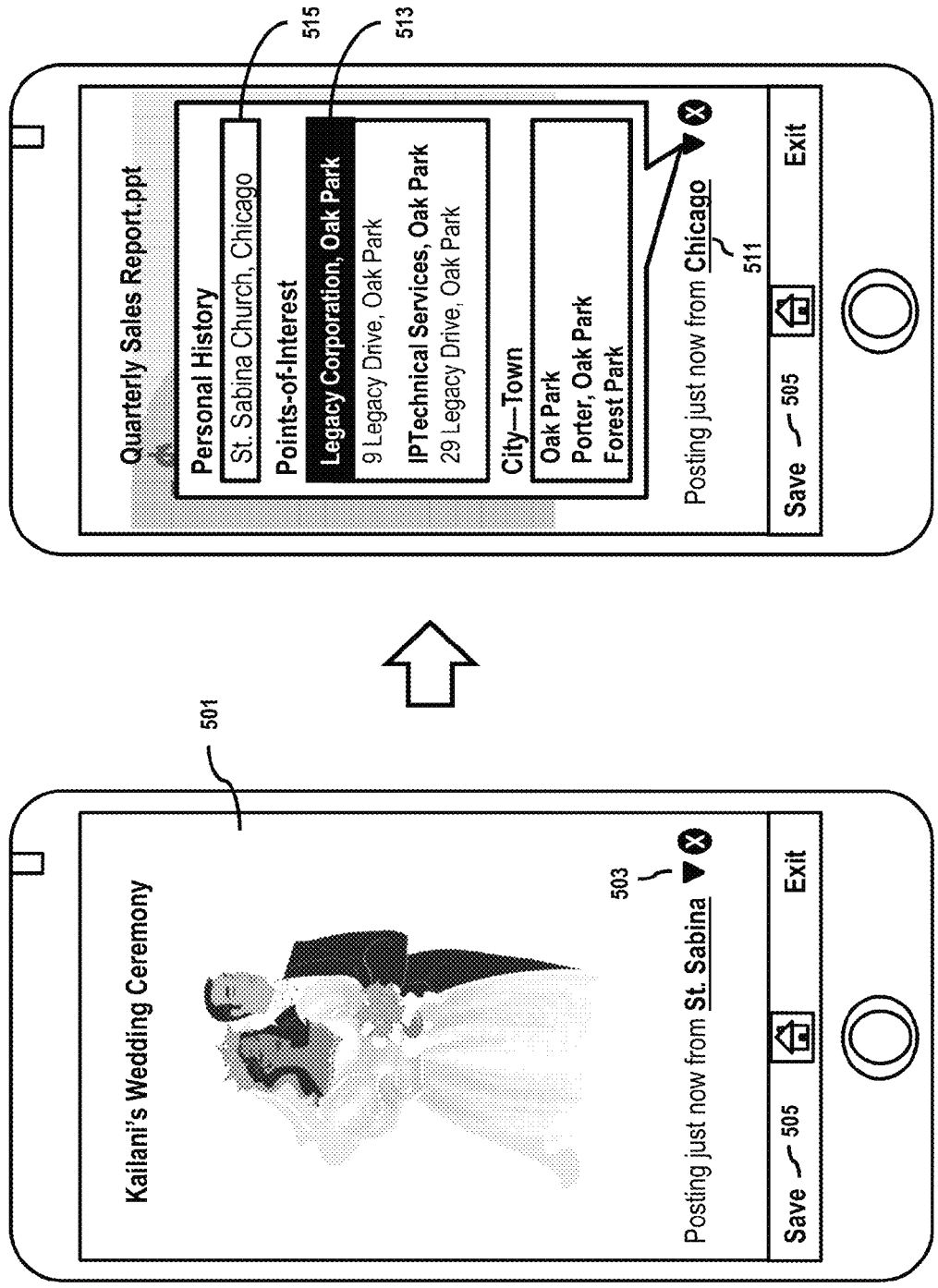

In FIG. 5, a user of a mobile device snaps a photo of a friend's wedding ceremony taking place at St. Sabina Chapel in Chicago. Under this scenario, the mobile device is equipped with one or more sensors for supporting location detection, including a GPS detection sensor. Per the executions of the location stamping platform 111, a location stamp relating to the POI entitled "St. Sabina" is automatically associated with the photo. Alternatively, the user may activate the drop down menu activation button 503 to review additional location stamp options. Once the user is finished, they can select the Save action button 505 to cause a storing of the photo in association with the location stamp to a data store of the user device.

Shortly after departing from the wedding, the user travels from the Chapel in Chicago to the neighboring town of Oak Park to participate in a sales meeting. In this case, the location of the sales meeting is literally across the street from the chapel as the two cities enjoy a common street as a dividing line. Hence, the meeting is within the predetermined proximity threshold of the prior location (St. Sabina Chapel). Upon arrival to the building where the meeting is taking place, the user downloads a quarterly sales report presentation and decides to associate a location stamp with the report. Noticing the current location 511 is represented as the neighboring city of Chicago, the user selects the drop down menu activation button 503 to review other location stamp candidates. A personal history location stamp 515 corresponding to St. Sabina Chapel is shown for selection given that the proximity condition is not exceeded. However, as the meeting is occurring in the Legacy Corporation building located in Oak Park, the user selects location stamp 513. As a result of this selection, the current location 511 is changed accordingly, and the user may store the presentation to a data store of the user device by selecting the Save action button 505.

The processes described herein for generating location stamps in response to a request from a device may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
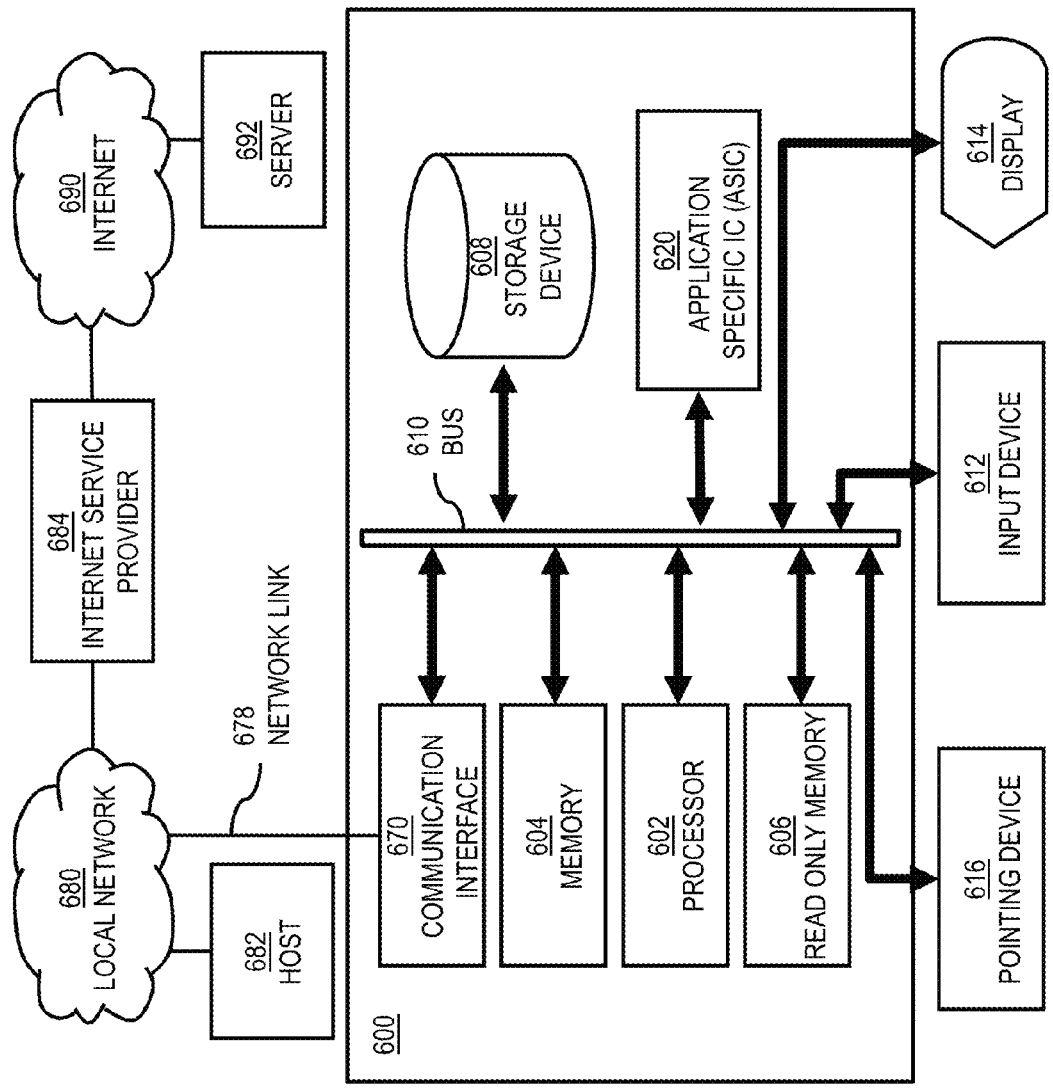
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to generate location stamps in response to a request from a device as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of generating location stamps in response to a request from a device.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to generate location stamps in response to a request from a device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for generating location stamps in response to a request from a device. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for generating location stamps in response to a request from a device, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for generating location stamps in response to a request from a device to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to generate location stamps in response to a request from a device as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of generating location stamps in response to a request from a device.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to generate location stamps in response to a request from a device. The memory 705 also stores the data associated with or generated by the execution of the inventive steps.

Figure 8:
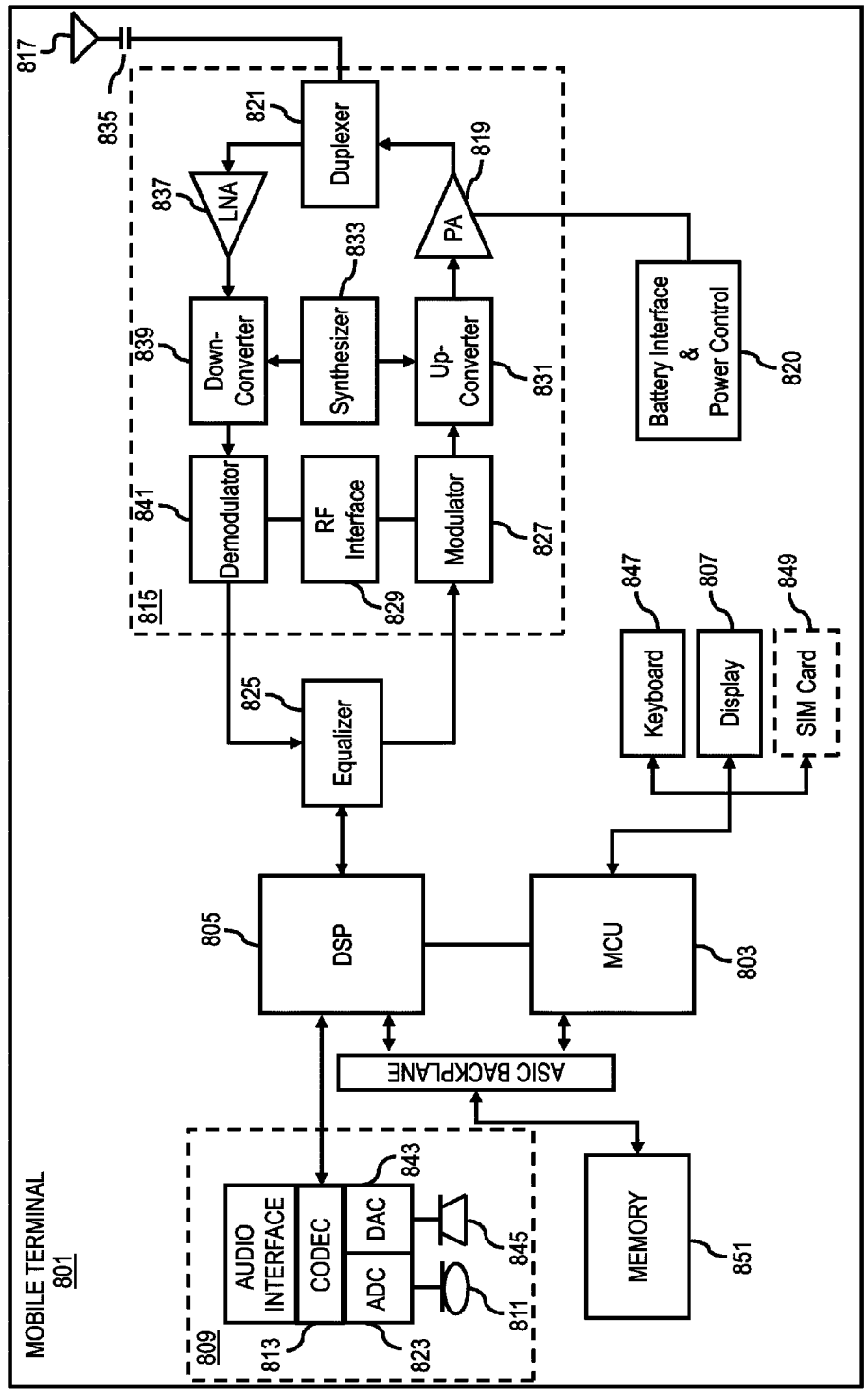
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of generating location stamps in response to a request from a device. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software and/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of generating location stamps in response to a request from a device. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to generate location stamps in response to a request from a device. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
 a request from a device for one or more location stamps;
 a processing of a hierarchy of one or more policies to determine one or more candidate location stamps in response to the request;
 at least one determination of a location associated with the device;
 a creation of a cache history comprising, at least in part, one or more previously used location stamps associated with the location;
 a creation of a personal history based, at least in part, on the cache history, one or more previously created cache histories, or a combination thereof; and
 a presentation of the one or more candidate location stamps at a user interface,
 wherein the one or more policies cause, at least in part, a determination of the one or more candidate location stamps based, at least in part, on the cache history, the personal history, a reverse geocoding, a point-of-interest determination, a regional determination, or a combination thereof associated with the device.

2. A method of claim 1, wherein the (1) data and/or (2) information and/or (3) at least one signal are further based, at least in part, on the following:
 at least one determination that the device has moved to another location that is beyond a predetermined proximity of the location; and
 a creation of another cache history associated with the another location.

3. A method of claim 2, wherein the
 creation of the personal history is further based, at least in part, on the another cache history.

4. A method of claim 1, wherein the (1) data and/or (2) information and/or (3) at least one signal are further based, at least in part, on the following:
 at least one determination of a presentation order of the one or more candidate location stamps based, at least in part, on the hierarchy.

5. A method of claim 1, wherein the (1) data and/or (2) information and/or (3) at least one signal are further based, at least in part, on the following:
 contextual information associated with the device,
 wherein the determination of the one or more candidate locations is further based, at least in part, on the contextual information.

6. A method of claim 5, wherein the contextual information includes, at least in part, timing information, location information, activity information, behavioral information, or a combination thereof.

7. A method of claim 1, wherein the (1) data and/or (2) information and/or (3) at least one signal are further based, at least in part, on the following:
 at least one determination of a granularity of the one or more candidate location stamps based, at least in part, on one or more privacy policies, one or more user preferences, or a combination thereof.

8. A method of claim 1, wherein the (1) data and/or (2) information and/or (3) at least one signal are further based, at least in part, on the following:
 a group history for the device, one or more other devices, or a combination thereof,
 wherein the determination of the one or more candidate location stamps is further based, at least in part, on the group history.

9. A method of claim 1, wherein the (1) data and/or (2) information and/or (3) at least one signal are further based, at least in part, on the following:
 another request to post event information, one or more content items, or a combination thereof from the device; and
 an initiation of the request for the one or more candidate location stamps based, at least in part, on the another request.

10. An apparatus comprising:
 at least one processor; and
 at least one memory including computer program code for one or more programs,
 the at least one memory and the computer program code configured to, with the at least one processor, cause the apparatus to perform at least the following,
 receive a request from a device for one or more location stamps;
 process and/or facilitate a processing of a hierarchy of one or more policies to determine one or more candidate location stamps in response to the request;
 determine a location associated with the device;
 cause, at least in part, a creation of a cache history comprising, at least in part, one or more previously used location stamps associated with the location;
 cause, at least in part, a creation of a personal history based, at least in part, on the cache history, one or more previously created cache histories, or a combination thereof; and
 cause, at least in part, a presentation of the one or more candidate location stamps at a user interface,
 wherein the one or more policies cause, at least in part, a determination of the one or more candidate location stamps based, at least in part, on the cache history, the personal history, a reverse geocoding, a point-of-interest determination, a regional determination, or a combination thereof associated with the device.

11. An apparatus of claim 10, wherein the apparatus is further caused to:
 determine that the device has moved to another location that is beyond a predetermined proximity of the location; and
 cause, at least in part, a creation of another cache history associated with the another location.

12. An apparatus of claim 11, wherein the
 creation of the personal history is further based, at least in part, on the another cache history.

13. An apparatus of claim 10, wherein the apparatus is further caused to:
 determine a presentation order of the one or more candidate location stamps based, at least in part, on the hierarchy.

14. An apparatus of claim 10, wherein the apparatus is further caused to:
 determine contextual information associated with the device,
 wherein the determination of the one or more candidate locations is further based, at least in part, on the contextual information.

15. An apparatus of claim 14, wherein the contextual information includes, at least in part, timing information, location information, activity information, behavioral information, or a combination thereof.

16. An apparatus of claim 10, wherein the apparatus is further caused to:

determine a granularity of the one or more candidate location stamps based, at least in part, on one or more privacy policies, one or more user preferences, or a combination thereof.

17. An apparatus of claim 10, wherein the apparatus is further caused to:
    determine a group history for the device, one or more other devices, or a combination thereof,
    wherein the determination of the one or more candidate location stamps is further based, at least in part, on the group history.

18. An apparatus of claim 10, wherein the apparatus is further caused to:
    determine another request to post event information, one or more content items, or a combination thereof from the device; and
    cause, at least in part, an initiation of the request for the one or more candidate location stamps based, at least in part, on the another request.

* * * * *